(12) United States Patent
Kalverkamp

(10) Patent No.: US 7,182,202 B2
(45) Date of Patent: Feb. 27, 2007

(54) CONVEYING DEVICE FOR BULK MATERIAL

(75) Inventor: Klemens Kalverkamp, Damme (DE)

(73) Assignee: Franz Grimme Landmaschinenfabrik GmbH & Co. KG, Damme (DE)

( * ) Notice: Subject to any disclaimer, the term of this patent is extended or adjusted under 35 U.S.C. 154(b) by 0 days.

(21) Appl. No.: 11/421,072

(22) Filed: May 31, 2006

(65) Prior Publication Data

US 2006/0266622 A1   Nov. 30, 2006

(30) Foreign Application Priority Data

May 31, 2005   (DE)   ................. 20 2005 008 426 U

(51) Int. Cl.
*B65G 15/30*   (2006.01)
(52) U.S. Cl. .................. 198/844.1; 198/845; 198/847; 198/848; 198/698; 198/728
(58) Field of Classification Search ............ 198/844.1, 198/845, 847, 848, 698, 699, 728, 860.3
See application file for complete search history.

(56) References Cited

U.S. PATENT DOCUMENTS

| | | | | |
|---|---|---|---|---|
| 336,126 | A | * | 2/1886 | Ludlum ................. 198/690.2 |
| 744,979 | A | * | 11/1903 | Rasmussen ................. 198/728 |
| 2,529,620 | A | * | 11/1950 | Marnach et al. ............ 460/114 |
| 3,015,381 | A | * | 1/1962 | Mohwinkel et al. ........ 198/834 |
| 3,288,296 | A | * | 11/1966 | Hirs ........................... 210/232 |
| 3,313,401 | A | * | 4/1967 | Oberholtz ................... 198/728 |
| 3,672,485 | A | * | 6/1972 | Walters ...................... 198/450 |
| 4,842,749 | A | * | 6/1989 | Cox ........................... 210/783 |
| 5,088,177 | A | * | 2/1992 | Jager ........................... 29/450 |
| 5,168,981 | A | * | 12/1992 | Ruff ........................... 198/850 |
| 5,660,266 | A | * | 8/1997 | Nolte ......................... 198/711 |
| 5,716,158 | A | * | 2/1998 | Hahn et al. ................. 403/291 |
| 5,860,511 | A | | 1/1999 | Ensch et al. |
| 6,106,391 | A | * | 8/2000 | Tjabringa ................... 460/144 |
| 6,237,754 | B1 | * | 5/2001 | Tjabringa et al. ........... 198/848 |
| 6,571,935 | B1 | * | 6/2003 | Campbell et al. ........ 198/690.2 |

FOREIGN PATENT DOCUMENTS

| | | |
|---|---|---|
| DE | 19734329 A1 | 2/1999 |
| EP | 1 300 062 A1 | 4/2003 |
| JP | 20011224416 A | 5/2001 |

* cited by examiner

*Primary Examiner*—Douglas A. Hess
(74) *Attorney, Agent, or Firm*—Gudrun E. Huckett

(57) ABSTRACT

A conveying device has a support frame and a conveying member with at least two driven conveying belts that circulate in parallel to one another and with a conveying fabric having at least one support surface and being arranged between the at least two conveying belts. The at least two conveying belts have inner sides facing one another; the inner sides have recesses. The conveying fabric has lateral edges inserted into the recesses. Support parts are attached in an overlapping area or an abutting area where the lateral edges of the conveying fabric and the at least two conveying belts overlap or abut one another. The support parts project upwardly past a plane of the support surface.

27 Claims, 6 Drawing Sheets

CONVEYING DEVICE FOR BULK MATERIAL

BACKGROUND OF THE INVENTION

The invention relates to a conveying device comprising a support frame, a conveying member that has at least two driven conveying belts that circulate in parallel to one another and a conveying fabric arranged between the conveying belts and having at least one support surface.

Conveying devices for bulk material are known in a plurality of configurations. The bulk material to be transported by the conveying device is placed at point A onto the endless circulating conveying member and transported to point B where the bulk material or other transported goods are dispensed. In order for the goods that are being transported not to fall laterally off the conveying member, the known conveying devices are provided with support parts that project past the plane of the support surface of the conveying member and are designed to retain transported pieces that threaten to fall off the conveying member.

European patent application 1 300 062 A1 discloses a conveying device of the aforementioned kind. The conveying devices of the aforementioned kind exhibit in general satisfactory transport efficiency. In the abutting area of the conveying fabric arranged between the conveying belts there is however the problem that material can slide into the gap between the conveying fabric and the conveying belts and can also be lost. Also, depending on the material to be transported it is possible that material to be transported or dirt particles collect in the abutting area and build a material deposit over time that causes the conveying fabric to bulge at the abutting area. In this way, the gap is enlarged to a hole which leads to greater losses. Also, an increasing material deposit can in the end lead to the conveying fabric to be torn; an exchange is then required.

The support parts can be fixedly attached to the support frame. In such an arrangement, there is however the disadvantage that the material to be transported scrapes across the support parts and is therefore slowed down. This leads to efficiency losses, and the transported material itself has the tendency to stay behind because of the braking effect and, in the case of a slanted conveying path, to roll down. Moreover, sensitive material to be transported, for example, harvested material, can become damaged by the support parts by friction or by being jammed.

In order to prevent these disadvantages, the support parts are often fastened directly to the endless circulating conveying member so that the support parts move at the same speed as the transported goods conveyed on the conveying member. In such an arrangement, the support parts no longer scrape across the transported goods. At locations where the conveying direction of the conveying member changes, the support parts are however compressed or expanded. At the abutting locations between the support surfaces and the conveying belts or the support parts, gaps are generated through which gaps the transported goods can fall from the conveying member and can be lost.

SUMMARY OF THE INVENTION

It is an object of the present invention to provide a conveying device of the aforementioned kind in which a material deposit in the transition area from the conveying fabric to the conveying belt is prevented if possible, in which the transported goods are secured in a better way against undesirable loss by falling off, in which the material wear of the structural components of the conveying device is reduced, and in which the risk of damage being done by the transport device is also reduced.

This is achieved in accordance with the present invention in that the conveying belts have recesses at their inner sides facing one another and the lateral edges of the conveying fabric are inserted into the recesses and/or support parts are attached in the overlapping area or abutting area of the edges of the conveying fabric and the conveying belts which support parts project upwardly past the plane of the support surface.

As a result of the combination of the attachment of the conveying fabric and support parts in the area of the recesses in the conveying belts it is possible to provide a permanent tight but still loadable and flexible transition zone in which the transported goods can no longer become damaged. The lateral boundary moves together with the conveying fabric so that friction at support parts will no longer occur at the sides. By attaching the conveying fabric and the support parts in a recess of the conveying belt, the compression forces and expansion forces that act on the conveying fabric and the support parts are at a comparatively low level in the area of directional changes of the conveying device. Accordingly, wear and material fatigue of the conveying fabric, of the support parts, and possibly additionally provided sealing elements are reduced in comparison to known solutions. In the configuration according to the invention, additional sealing parts are not required at all.

According to a modification of the inventive principle, the object is also solved in that the conveying belts have recesses at their inner sides facing one another into which recesses the lateral edges of the conveying fabric are inserted and in that the conveying fabric in the area of the recesses is connected by means of the edges of the conveying fabric to the conveying belts.

As a result of the recesses within the conveying belts, space is provided in order to extend the conveying fabric past the intermediate space between the spaced-apart conveying belts into the area of the conveying belts so as to provide overlap in order to bridge the gap that is provided in the abutting area of the prior art. Because of the recesses, the conveying fabric can be inserted into the contour of the conveying belt so that it does not project upwardly at individual locations and does not create new gaps through which, in turn, transported material or dirt particles can pass and build deposits or through which transported material can be lost. As a result of the lateral surfaces of the recesses in the conveying belts, flat attachment surfaces are formed on which the conveying fabric can be connected to the conveying belts. Because of the direct connection of the conveying belt and the conveying fabric, the drive forces acting on the conveying belts can be transmitted uniformly onto the conveying fabric. At the same time, the connection of the conveying fabric and the conveying belt in the area of the recess provides a uniform transmission onto the conveying belt of static or dynamic forces that act on the conveying fabric. Because the edges of the conveying fabric are inserted into the neutral phase of the conveying belt, the edges are protected particularly well against any damage. Finally, it is possible to combine the attachment of the conveying fabric and the attachment of transverse rods that are mounted between the conveying belts.

As a result of the embodiment according to the invention, an inexpensive and easily produced connection of the conveying fabric and the conveying belts results with which gaps that can lead to material build-up are avoided and the service life of the conveying fabric is improved. The conveying fabric can no longer fray easily or tear at the edges and, as a whole, a more uniform distribution of the forces acting within the conveying member is provided.

According to a further embodiment of the invention, the object is solved for a conveying device of the aforementioned kind in that the conveying member has lateral support parts that project upwardly past the plane of the support surfaces and comprise a base element and at least one finger projecting from the base element, wherein neighboring fingers are arranged such that the fingers delimit an intermediate space between them when on a straight transport plane of the conveying member.

By means of the base element, the support part can be attached to the support frame or the conveying member or the carrying means. The attachment is realized in such a way that the finger projecting upwardly from the base element projects also past the plane of the support surfaces and, in this way, when arranged laterally relative to the support surface of the conveying member, can provide a supporting action for the transported goods conveyed on the conveying member.

By means of the intermediate space between two neighboring fingers, the fingers in the area of the deflection of the conveying member in or counter to the conveying direction of the conveying member can be pivoted without the fingers necessarily rubbing against one another when doing so. The intermediate space can extend so far that it substantially extends across the entire height of one finger but it can also be shorter inasmuch as the still provided flexibility in the conveying direction is sufficient for adjusting to the bending radii about which the conveying member is guided.

When the movement direction of the base element changes as a result of the deflection of the conveying direction of the conveying member, a finger connected to this base element can also be pivoted about a transverse axis and can change its position in space in this way. For such a change of the spatial position, the finger pivots first into the free intermediate space by which the pivoted finger is separated from the neighboring finger. Since the pivoted finger is moved through a free space, such a pivot movement remains completely wear-free. Only for greater angular positions about which the finger is pivoted, the finger will hit a neighboring finger.

When the fingers are made from a material that is at least somewhat flexible, the fingers can slide easily out of the way when hitting a neighboring finger and, in this way, can move past one another. The wear-entailing sliding contact between two neighboring fingers is however limited to the outer tips of the fingers that are at the same time farthest away from the base element so that the elasticity of the finger in this area exhibits its maximum effect and the friction forces with which the surfaces rub against one another can be kept within an uncritical range.

Based on the arrangement of the fingers in accordance with the invention a further advantage results: while large-size transported goods that are transported on the conveying member are too large to be able to pass through the intermediate spaces between the fingers, it is possible that dirt and sand can fall off the conveying path of the conveying member by passing through the intermediate spaces. In this way, the transported goods to be conveyed can be separated from dirt and foreign matter.

When the base element is in the form of a strip, the bottom side has a large contact surface with which the base element can be attached to the conveying member and/or the circulating carrying means. On one section of the base element several fingers can be arranged adjacent to one another with an intermediate space between them, respectively. By attaching an individual base element, several fingers can accordingly be mounted on the conveying member, the circulating carrying means and/or the support frame.

When the base element of the support part is made from flexible material, it can even adjust to tighter bending radii of the conveying member or the carrying means and can circulate with it in an endless fashion. The base elements of the support parts can have a comparatively flat shape so that they project hardly past the support surfaces of the conveying member. In the case of a flat cross-section, the base elements are exposed only to comparatively minimal tensile, compressive and bending forces when circulating so that the base elements do not move or move only minimally relative to the conveying member and/or the carrying means. In this way, wear of the contact surfaces is kept minimal. On the other hand, the fingers projecting from the base elements ensure that the support surfaces of the conveying member provide lateral support in regard to otherwise possibly falling transported goods.

Independent of whether the fingers are pushed together or spread apart, the fingers, depending on the selected dimension of the intermediate spaces between two fingers, remain at such a spacing relative to one another that falling of transported goods off the conveying device is prevented reliably.

Further improvements and preferred embodiments of the invention can be taken from the characterizing features of the dependent claims, the following description and the drawings.

BRIEF DESCRIPTION OF THE DRAWINGS

The invention will now be described with the aid of one embodiment in more detail. It is shown in.

DESCRIPTION OF PREFERRED EMBODIMENTS

Figure 1:
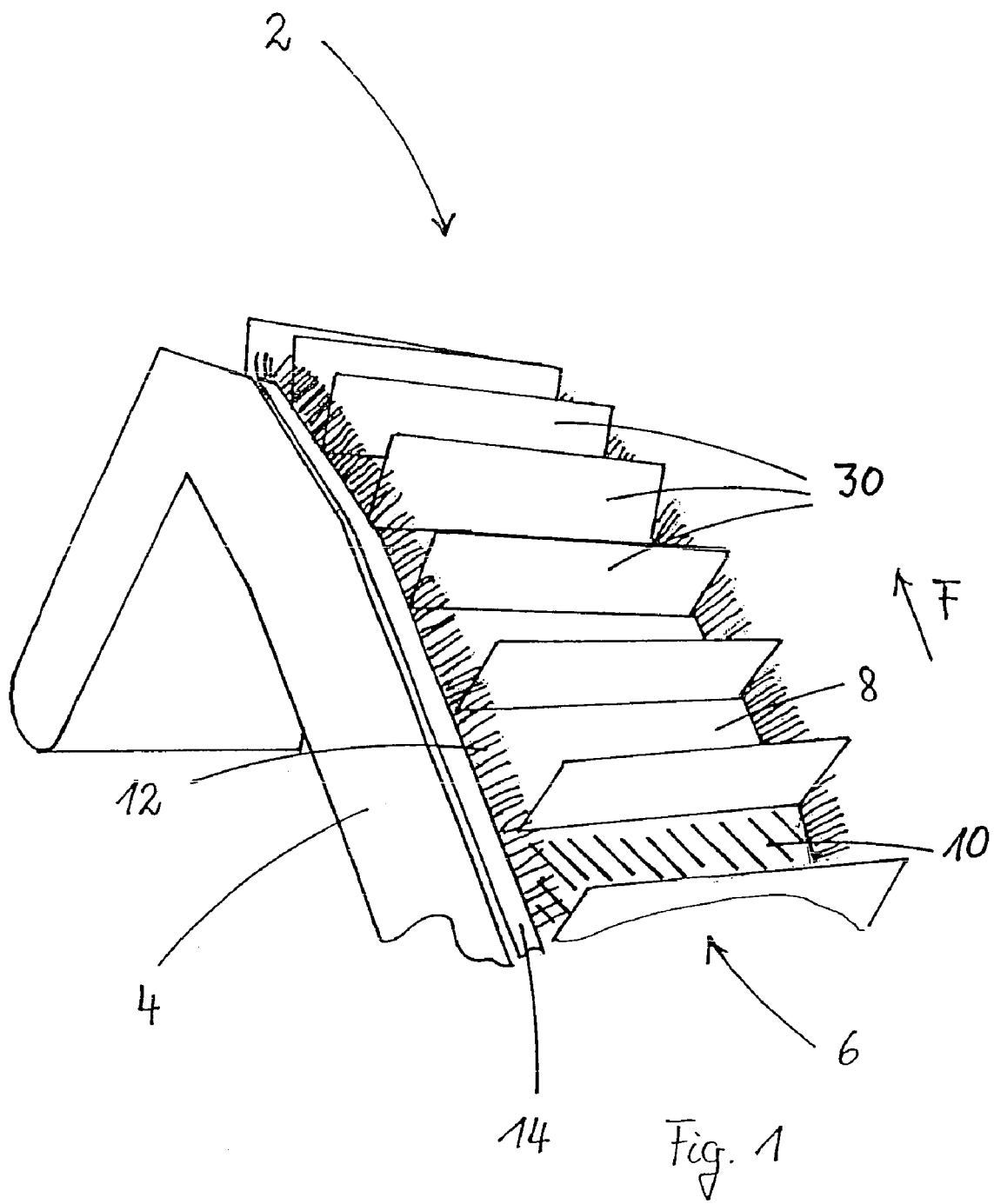
FIG. 1 a perspective view of a conveying device.

FIG. 1 shows a conveying device 2 having a support frame 4 on which an endless conveying member 6, illustrated only partially, is arranged so as to circulate. The conveying member 6 has support surfaces 10 that are separated from one another by partitioning elements 30. The conveying member 6 of the illustrated embodiment moves goods to be transported resting on the support surfaces 10 of a conveying fabric 8 in the conveying direction F. The goods to be transported resting on the support surfaces 10 are prevented by the partitioning elements 30 from rolling down the conveying member 6 counter to the conveying direction F. In order to prevent the material to be transported to drop or fall laterally off the support surfaces 10, support parts 12 are arranged at the sides of the support surfaces 10 of the conveying member 6. The support parts 12 can be attached either to the conveying member 6 or the support surfaces 10 of the conveying member 6; alternatively, the support parts 12 can be connected fixedly to the conveying belts 4 that act as carrying means. The conveying belts 14 that carry the conveying member 6 and the material to be transported thereon can be embodied, for example, as toothed belts but also in the form of appropriately designed chains. Of course, the conveying member 6 during its circulation can be supported across sections thereof or completely by additional support wheels or support surfaces. In the illustrated embodiment, the conveying belt 14 serves for transmitting drive forces received from a drive source onto the conveying member 6 in addition to providing a positional fixation of the conveying member 6.

FIG. 1 illustrates that the conveying member 6 in the illustrated lower section is moved in a straight upwardly oriented transport plane while toward the upper third of the illustrated conveying path it is angled slightly in a horizontal direction and at the apex is angled sharply in a downward direction; finally, after a further conveying stretch it is deflected by 180 degrees about a deflection roller in order to be returned. In the illustrated embodiment, the bottom of the conveying device 2 is covered so that the conveying member 6 cannot be seen in detail.

Figure 2:
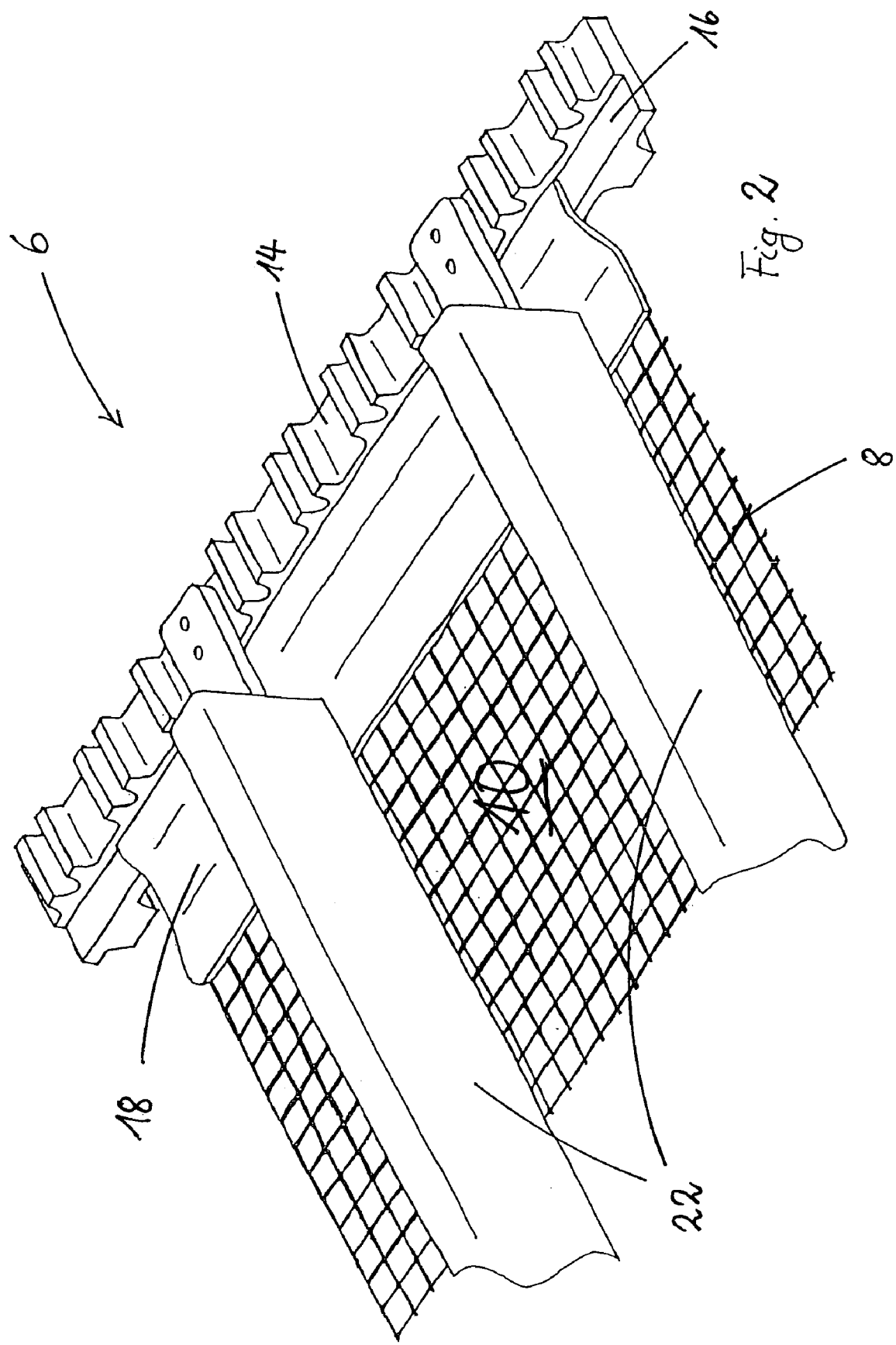
FIG. 2 a perspective detail view of a section of the conveying member.

In FIG. 2, a section of the conveying member 6 is illustrated that is driven in endless circulation and transports on its surface the transported goods collected thereon in the conveying direction. The conveying member 6 is comprised of two parallel extending, circulatingly driven conveying belts 14, for example, toothed belts, that are connected to one another by transverse rods 22 that are distributed at a spacing to one another across the length of the conveying belts 14. In order to provide a closed surface suitable for conveying purposes, a conveying fabric 8 is provided in the area between the spaced-apart conveying belts 14 and the spaced-apart transverse rods 22 on which fabric the goods to be transported are conveyed. The transverse rods 22 and the conveying fabric 8 transmit the drive energy of the conveying belts 14 onto the transported goods resting on the conveying member 6.

On their inner sides facing one another, the conveying belts 14 have recesses 16. The recesses 16 are depressions shaped out of the cross-section of the conveying belts and providing a space into which the edge 18 of the conveying fabric 8 can be inserted without the edge projecting past the remaining contour of the conveying belt 14. In the area of the recesses 16, the edge 18 of the conveying fabric 8 is connected to the conveying belt 14. The connection itself can be realized by known fastening means, for example, rivets, screws, adhesives, by sewing etc.

Figure 3:
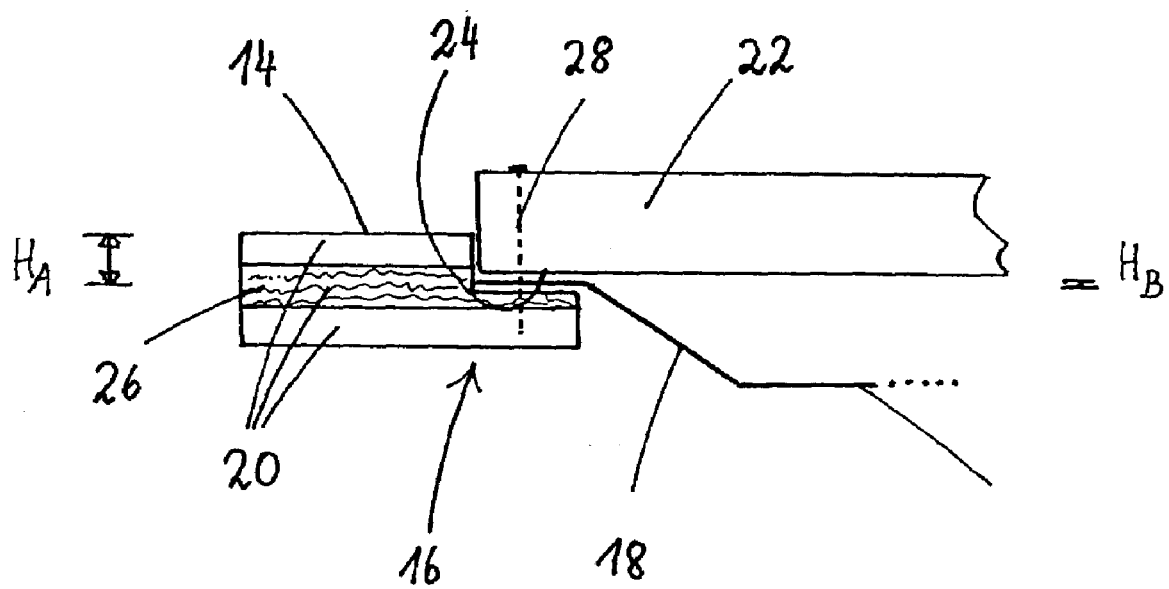
FIG. 3 a cross-section of the attachment area of the conveying fabric at a conveying belt.

By shaping the cross-section of the conveying belts 14 so as to have a recess 16, its suitability as a drive means for the conveying member 6 must not be negatively affected. Such a negative effect is in particular prevented when the conveying belts 14 are of a multi-layer configuration and the height of the recess 16 does not extend across all layers 20 of the conveying belt 14, as illustrated in FIG. 3. As can be seen in FIG. 3, the central layer 26 of the conveying belt 14 has a fabric layer of fibers and the fibers transmit the tensile forces acting on the conveying belt 14 in the longitudinal direction of the conveying belt 14. Because the recesses 16 do not extend across the complete height $H_A$ of the conveying belt 14, a portion of the fabric layer of the central layer 26 remains available in the area of the recess 16. At the same time, FIG. 3 shows also that the height $H_A$ of the recess 16 is greater or identical to the height $H_B$ of the lateral edges 18 of the conveying fabric 8. Also, FIG. 3 shows that the recess 16 has a width that corresponds maximally to half the width of the conveying belts 14.

In order to connect the edge 18 of the conveying fabric 8 even more securely to the conveying belt 14, it is possible to place the transverse rods 22 with their underside 24 on the lateral edges 18 of the conveying fabric 8 in the area of the recesses 16. The transverse rods 22 can then be attached by means of tabs that laterally project past the recess 16 to the conveying belts and/or the transverse rods 22 are connected by means of fastening means passing through the conveying fabric 8, for example, rivets 28, screws, clamps and the like, to the conveying belts 14.

A completely tight connection of the edges 18 on the conveying belt 14 results when the recesses 16 extend across the full length of the conveying belts 14 and the edges 18 are inserted into the recess 16 across the full length of the conveying device.

The lateral edges 18 of the conveying fabric 8 can be attached particularly well in the area of the recesses 16 when they have a closed material structure. The edges 18 can be, for example, comprised of a thick plastic film, a dense fabric, a coated fabric, a rubber fabric or the like. By providing the lateral edges 18 of the conveying fabric 8 with a certain flexibility, the load peaks resulting from static or dynamic forces can be compensated by them. In order to be loadable more strongly, fiber reinforcements can be embedded in the lateral edges 18 of the conveying fabric 8. When a flexible material is used for the lateral edges 18, the flexible material can adjust particularly well to the dynamic conditions upon circulation of the conveying member 6.

Figure 4:
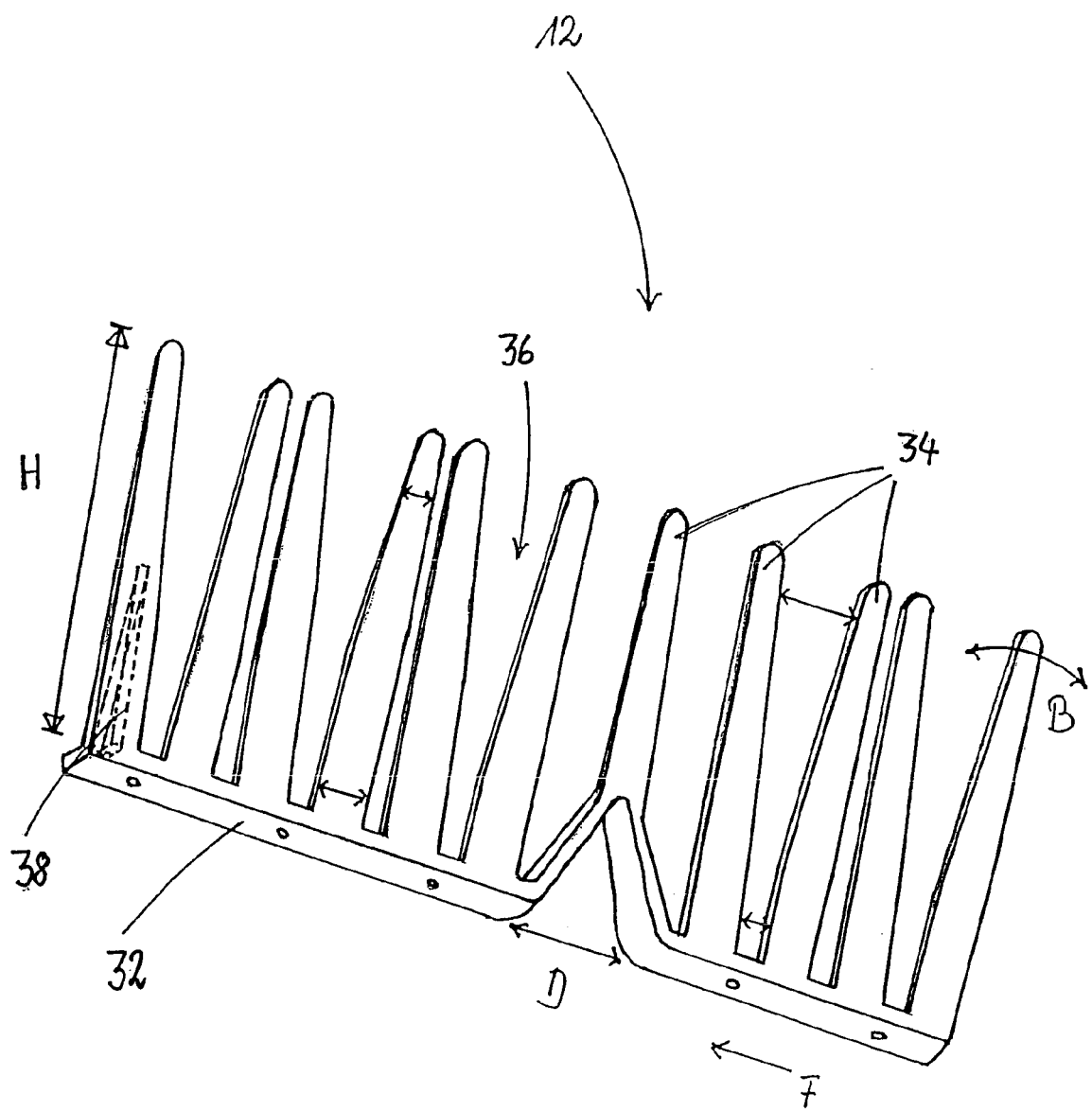
FIG. 4 a perspective view of a support part.

In FIG. 4, an embodiment of the support part 12 in a perspective bottom view is illustrated. The base element 32 can be seen very well in this view; in the illustrated embodiment, the base element 32 is strip-shaped and has several openings for fastening the base element to the conveying member 6 and/or the conveying belt 14. The term base element is not meant to imply that it must be a separate component; the base element can form a monolithic part together with one or several fingers 34 that together form a support part 12. The base element 32 is the functional part of the support part 12 that connects one or several fingers 34 to the conveying belt 14 and/or the conveying member 6 or the conveying fabric 8. The base element 32 receives the bending forces acting laterally on one or several fingers and transmits them onto the conveying belt 14 and/or the conveying member 6 or the conveying fabric 8. Also, the fingers 34 are maintained in their mounted position by the base element 32.

Eleven fingers 34 project from the base element 32 in the embodiment illustrated in FIG. 4. Between the fingers, an intermediate space 36 is provided, respectively. The intermediate spaces 36 must not be uniform or geometrically uniform in relation to one another but can also have, viewed in the direction of their height and/or in the conveying direction of the conveying member 6, different widths. In the embodiment illustrated in FIG. 4, the height H of the intermediate spaces 36 corresponds to the height by which the fingers 34 project from the base element 32; however, the intermediate spaces 36 can be shorter and can have a smaller height. In order to ensure a satisfactory flexibility of the support parts 12 particularly in the conveying direction F, it is advantageous when an intermediate space 36 projects at least across half the height of an adjoining finger 34.

Since the base element 32 has a greater width in the direction transverse to the conveying direction F than the fingers 34 projecting from the base element 32, a high support action of the fingers 34 by means of the base element 32 in the lateral direction is provided.

When a base element 16 stationarily mounted on a conveying member 6 or conveying belt 14 reaches a section of the conveying device 2 in which the conveying direction of the conveying member 6 or the conveying belt 14 is deflected, the part of the base element that is located within the deflection area is adjusted to the new conveying direction F when the base element is of a flexible configuration. As a result of the different spatial orientation of the corresponding section of the base element 32 that is caused by the adjusting movement, the finger 34 that is connected to the respective section of the base element 32 is pivoted in the direction B about a pivot axis extending transversely to the conveying direction F. Depending on the deflection direction in the deflection area, the finger 34, viewed in the conveying direction F, can pivot to the front or to the rear. For a pivot movement to the front, the intermediate space 36 spreads between the pivoted finger 34 and the subsequent finger 34 while the intermediate space 36 is reduced when a pivot movement to the rear occurs. The smaller the bending radius to which the respective section of the base element 32 is adjusted, the greater the pivot movement of the correlated finger 34 essentially parallel to the conveying direction F of the conveying member 6 and also the change of the spacing within the remaining intermediate space 36 relative to the neighboring finger 34.

The intermediate spaces 36 can have different spacings between the neighboring fingers 34 across their height H. A different spacing can result, for example, when a finger 34 is more narrow in a section that is farther away from the base element 32 than in a section that is closer to the base element 32. Also, it is possible that the intermediate space 36 between two neighboring fingers 34 in a straight transport plane is wider in a section remote from the base element 32 than in a section that is closer to the base element 32. Also, the two possibilities of providing the fingers 34 in the intermediate spaces 36 with different dimensions, can be combined in a suitable way with one another as illustrated in the embodiment of FIG. 4.

The base element 32 illustrated in FIG. 4 has several fingers 34 attached thereto but it is also possible to provide a base element 32 with one finger 34, respectively. In such a configuration, across the length of a conveying member 6 many base elements 32 must be attached on the conveying member 6 or the conveying belt 14. Providing several fingers 34 on one base element 32 simplifies mounting. Moreover, the load forces acting on an individual finger 34 are better distributed across the length of a longer base element 32. In order to be able to provide an excellent support action, support ribs 38 can be provided on the sides of a finger 34 facing away from the support surface 10 which support ribs can extend across a portion or the entire height of the finger 34. In the transverse direction relative to the conveying direction F, a finger 34 has limited movability. The size of the movability in the transverse direction can be affected by the shape of the finger and the employed material but also by the shape, the material, and the size of the support ribs 38. The movability should be selected such that bending forces that can be received by a finger 34 are sufficient in order to be able to retain the material that is usually being transported on the conveying device 2.

In the area of the section D the base element 32 is higher over sections thereof than other sections. Such a height increase can be provided in order to bridge fastening elements connecting the conveying member 6 and the conveying belt 14 and to provide a corresponding passage.

In the illustrated embodiment, the fingers 34 project in an almost vertical direction upwardly from the base element 32. However, it is also possible to have individual or several fingers 34 that project upwardly from the base element in a direction that deviates from a vertical line. In order to prevent a collision of fingers 34 in a deflection area, it is possible to arrange sequentially arranged fingers 34 at full height or partial height in a different angular position so that the fingers in the area of a pivoting action in a direction parallel to the conveying direction of the conveying member 6 can pivot past one another without contacting one another or by being subjected to only minimal bending forces.

In one configuration of the invention, the base elements 32 are attached to the circulating conveying belt 14. In this connection, the base elements 32 have such a flat profile that their height corresponds approximately to the neutral phase of the conveying belt and does not project or hardly projects past the conveying belts 14.

Figure 5:
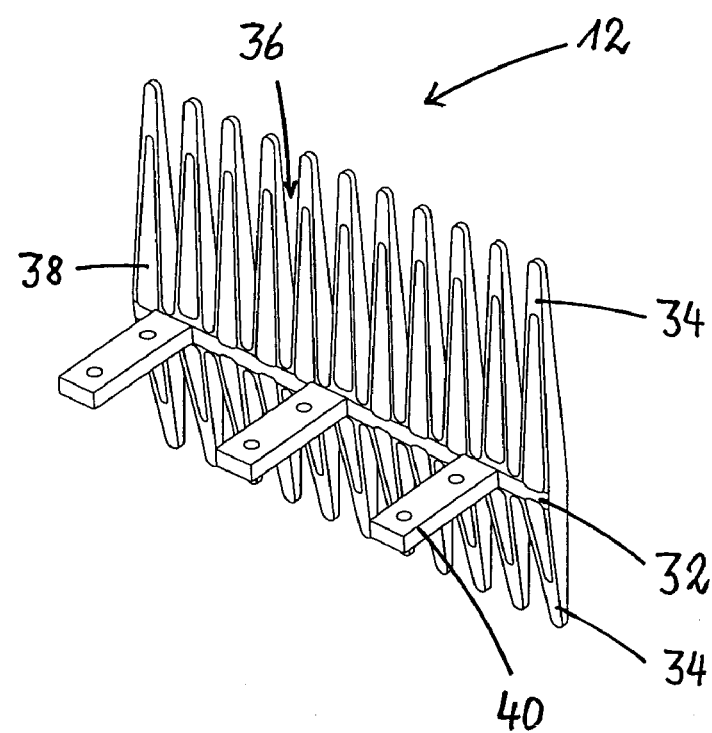
FIG. 5 a perspective view of an alternatively designed support part.

In FIG. 5, an alternative configuration of a support part 12 is illustrated. In the illustrated support part 12, the base element 32 is not arranged on the underside of the support part 12 but approximately at the transition between the lower and central third or approximately at the central area of the height H of the support part 12. The fingers 34 of the support part 12 illustrated in FIG. 5 thus project into an area below the base element 32. The sections of the fingers 34 that project downwardly past the base element 32 extend in the illustrated embodiment approximately vertically as do the sections projecting upwardly past the base element 32. The sections of the fingers 34 projecting downwardly past the base element 32 however can be angled in order to project in this way into the area of the neighboring conveying fabric 8. When the conveying fabric 8 is loaded in this area by transported material, the transported material forces the conveying fabric downwardly onto the sections of the fingers 34. As a result of the swivel joint action of the base element 32 that is approximately located centrally, the sections of the fingers that project upwardly past the base element 32 are pressed inwardly against the transported goods. The load of the transported goods acting on the lower sections of the fingers 34 increases in this way the potential retaining force of the upper sections of the fingers 34.

The base element 32 illustrated in FIG. 5 has on one side support tabs 40 with which the support part 12 can be attached to the conveying member 6, the conveying fabric 8, and/or the conveying belts 14. The support tabs 40 can have such a length that they extend across the entire width of the conveying belt 14.

Figure 6:
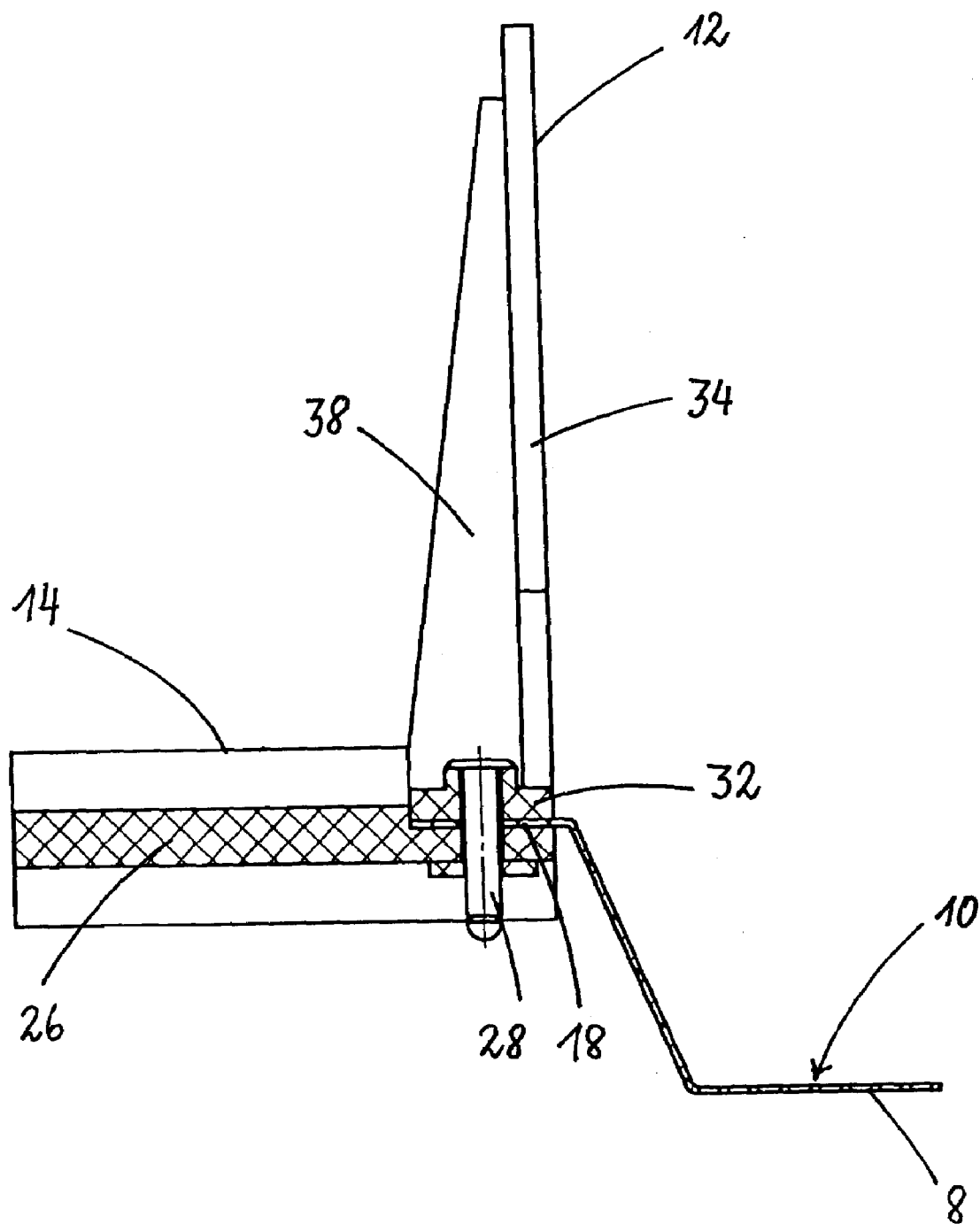
FIG. 6 a cross-sectional view of the support part attached to the conveying fabric and to a conveying belt.

In FIG. 6, a cross-section view onto a support part attached to the conveying fabric and the conveying belt is illustrated. In this illustration it is clearly shown that the conveying belts 14 have recesses 16 at their facing inner sides into which the lateral edges 18 of the conveying fabric 8 are inserted; in the overlap area of the edges of the conveying fabric 8 and the conveying belts 14, the support parts 12 are attached that project upwardly past the plane of the support surface 10. In this arrangement, an excellent sealing action against undesirable losses is provided in the transition zone between the conveying fabric 8 and the conveying belt 14. Also, it can be easily seen that the support part 12 is able to support the transported goods conveyed on the conveying fabric 8 in regard to falling off laterally.

The conveying fabric 8 and the support part 12 are attached by a common rivet 28 to the conveying belt 14 so that the manufacturing costs are reduced. Moreover, because of the comparatively large contact area of the underside of the base element 32 on the edge 18 of the conveying fabric 8 and the compression of the material layers by the rivet 28 a comparatively high clamping force on the edge of the conveying fabric 8 results by which it is secured safely in its mounted position. Also, the acting loads can be distributed approximately uniformly across the entire surrounding contact surface so that localized peak loads not only act locally on the connecting zone which could lead to the conveying fabric 8 tearing at this location.

The illustration of FIG. 6 shows also that the conveying fabric 8 can sag below the plane of the conveying belts 14. Such sagging can be desirable in order to support the transported goods conveyed on the conveying fabric 8 not only by the support parts 12 but additionally or only by the conveying belt 14. In the lateral direction, the conveying belt 14 provides a very great resistance; the support parts 12 can be designed to be softer in comparison to the conveying belts 14.

Figure 7:
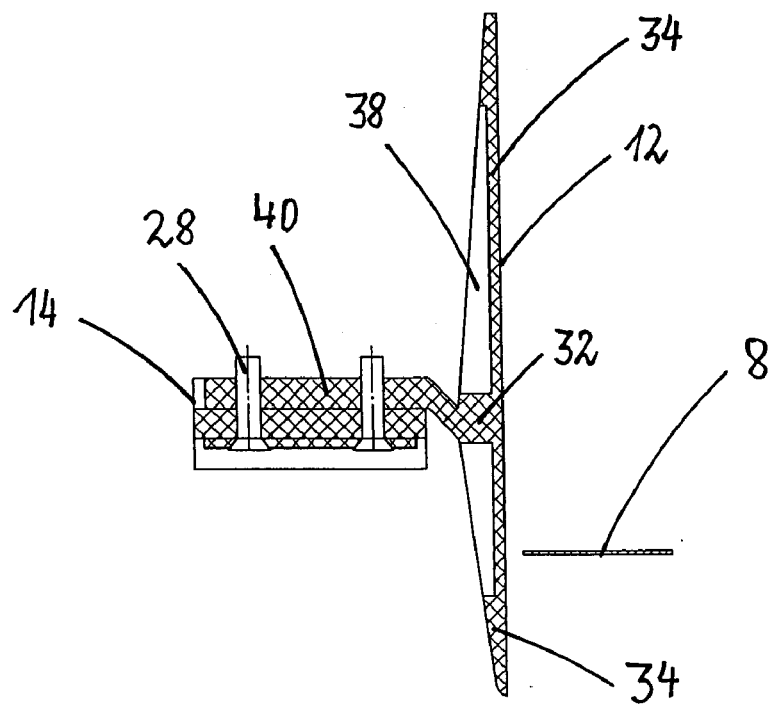
FIG. 7 a cross-sectional view of a conveying belt with alternatively designed support part.

An additional embodiment is illustrated in FIG. 7. The cross-sectional illustration shows the combination of a conveying belt 14 and the alternative support part 12 shown in FIG. 5. It can be seen that the section of the fingers 34 projecting downwardly past the base element 32 project farther downwardly than the lowest point of the conveying fabric 8. In this configuration, the conveying fabric 8 is therefore supported in the downward direction about its full height laterally by the fingers 34. The conveying fabric 8 can be connected to the fingers 34 in the area of the downwardly projecting section of the fingers 34 projecting past the base element 32; however, this possibility is not illustrated in detail in FIG. 7. FIG. 7 illustrates instead a configuration in which the edge 18 of the conveying fabric 8 is not inserted into the recess 16; at least with sections thereof the conveying fabric 8 extends only approximately to the area where it abuts the conveying belt 14. The abutting area of the edges 18 of the conveying fabric 8 must not be positioned in a common plane with the lateral edges of the conveying belt 14 but can also be stepped and positioned in a plane below. The vertical displacement is covered by the support parts 12 whose fingers 34 project to a level below the conveying belt 14. Also, the edges 18 of the conveying fabric 8 must not end precisely in a vertical line relative to the sides of the conveying belt 14 in order to be positioned in the abutting area but they can be somewhat shorter or longer. The supporting action of the transported goods and the sealing action of the conveying fabric 8 relative to material loss in the area of the step of the edges 18 of the conveying fabric 8 relative to the conveying belt 14 is realized in this configuration by the support parts 12. Accordingly, the invention can be realized by insertion of the conveying fabric 8 into the recess 16, or by the support parts 12 connected to the conveying belt 14 and moved by it, or a combination of these two configurations.

The lower ends of the fingers 34 of the embodiment illustrated in FIG. 7, either individual ones at certain spacings or all of them, can be provided with a projection that projects into the space underneath the conveying fabric 8; the conveying fabric 8 can be connected to these projections of the fingers 34. Accordingly, the edges 18 of the conveying fabric 8 are supported and positionally fixed.

The embodiments illustrated in the drawings serve only for describing the invention in exemplary fashion and are not meant to limit the invention to these embodiments. For example, a person skilled in the art will be able to adjust the subject matter of the afore described invention with regard to respective technical requirements, in particular, to modify the support parts 12 in any suitable form. This can be realized, for example, in that the shape of the fingers 34, the spacing of neighboring fingers 34 relative to one another, and the height of the fingers 34 can be varied. Also, the fingers 34 must not have identical height; they can vary with regard to height. Also, the flexibility of the base element 32 as well as of the fingers 34 can be matched to the respective application. The base element 32 can have greater flexibility than the fingers 34 or the fingers 34 can have a section with a constriction by which they can be pivoted more easily in one direction. Also, the desired flexibility of a support part 12 can be affected by different materials and material mixtures in different sections of the support part 12 in the desired way. Moreover, it should be noted that a support part 12 can be manufactured as an inexpensive plastic part by injection molding.

The specification incorporates by reference the entire disclosure of German priority document 20 2005 008 426.3 having a filing date of May 31, 2005.

While specific embodiments of the invention have been shown and described in detail to illustrate the inventive principles, it will be understood that the invention may be embodied otherwise without departing from such principles.

What is claimed is:

1. A conveying device comprising:
   a support frame;
   a conveying member comprising at least two driven conveying belts that circulate in parallel to one another and further comprising a conveying fabric having at least one support surface and being arranged between the at least two conveying belts;
   wherein the at least two conveying belts have inner sides facing one another and wherein the inner sides have recesses;
   wherein the conveying fabric has lateral edges inserted into the recesses;
   support parts attached in an overlapping area or an abutting area where the lateral edges of the conveying fabric and the at least two conveying belts overlap or abut one another, respectively;
   wherein the support parts project upwardly past a plane of the support surface.

2. The conveying device according to claim 1, wherein the support parts are placed onto the lateral edge of the conveying fabric.

3. The conveying device according to claim 1, wherein the at least two conveying belts each have multiple layers, wherein a height of the recesses does not extend across all of the multiple layers, respectively, wherein said height of the recesses is greater or identical to a height of the lateral edges, and wherein the conveying fabric is connected to the at least two conveying belts by gluing; riveting; or gluing and riveting.

4. The conveying device according to claim 3, wherein the multiple layers comprise a central fabric layer, wherein said height of the recesses extends to the central fabric layer and maximally across half a width of the at least two conveying belts; respectively.

5. The conveying device according to claim 1, wherein the conveying member further comprises transverse rods connecting the at least two conveying belts to one another, wherein the transverse rods are distributed across a length of the at least two conveying belts; wherein the transverse rods each have an underside resting on the lateral edges of the conveying fabric in the area of the recesses, and wherein the transverse rods are connected to the at least two conveying belts by rivets, screws, or clamps, wherein the rivets, screws, or clamps pass through the conveying fabric.

6. The conveying device according to claim 1, wherein the lateral edges of the conveying fabric have a closed material structure.

7. The conveying device according to claim 1, wherein the lateral edges of the conveying fabric comprise at least one of flexible material; tenso-elastic material that is tenso-elastic in at least one direction; and embedded fiber reinforcements.

8. The conveying device according to claim 1, wherein the support parts are components of the conveying member, wherein the support parts each have a base element and at least one finger projecting in an approximately vertical direction from the base element, respectively, wherein the base element is comprised of flexible material, wherein the at least one finger is pivotable parallel to a conveying direction of the conveying member by a change of a spatial position of the base element, respectively.

9. The conveying device according to claim 8, wherein the at least one finger in a transverse direction relative to a conveying direction of the conveying member has in at least one section a thickened portion or a support rib.

10. The conveying device according to claim 8, wherein the at least one finger is narrower in a section that is farther away from the base element than in a section that is closer to the base element.

11. The conveying device according to claim 8, wherein the base element is strip-shaped and the at least one finger is attached to the base element, respectively.

12. The conveying device according to claim 8, wherein the at least one finger of the support parts has a section projecting downwardly into an area underneath the base element and said section projects farther downwardly than a lowest point of the conveying fabric, wherein the conveying fabric is optionally connected to said section projecting downwardly.

13. A conveying device comprising:

a support frame;

a conveying member comprising at least two driven conveying belts that circulate in parallel to one another and further comprising a conveying fabric arranged between the at least two conveying belts;

wherein the conveying belts have inner sides facing one another and the inner sides have recesses;

wherein the conveying fabric has lateral edges inserted into the recesses;

wherein the lateral edges of the conveying fabric are connected in the area of the recesses to the at least two conveying belts, respectively.

14. The conveying device according to claim 13, wherein the at least two conveying belts each have multiple layers, wherein a height of the recesses does not extend across all of the multiple layers, respectively, wherein said height of the recesses is greater or identical to a height of the lateral edges, and wherein the conveying fabric is connected to the at least two conveying belts by gluing; riveting; or gluing and riveting.

15. The conveying device according to claim 14, wherein the multiple layers comprise a central fabric layer, wherein said height of the recesses extends to the central fabric layer and maximally across half a width of the at least two conveying belts; respectively.

16. The conveying device according to claim 13, wherein the conveying member further comprises transverse rods connecting the at least two conveying belts to one another, wherein the transverse rods are distributed across a length of the at least two conveying belts; wherein the transverse rods each have an underside resting on the lateral edges of the conveying fabric in the area of the recesses, and wherein the transverse rods are connected to the at least two conveying belts by rivets, screws, or clamps, wherein the rivets, screws, or clamps pass through the conveying fabric.

17. The conveying device according to claim 13, wherein the lateral edges of the conveying fabric have a closed material structure.

18. The conveying device according to claim 13, wherein the lateral edges of the conveying fabric comprise at least one of flexible material; tenso-elastic material that is tenso-elastic in at least one direction; and embedded fiber reinforcements.

19. A conveying device comprising:

a support frame;

a conveying member comprising at least two driven conveying belts that circulate in parallel to one another and further comprising a conveying fabric having at least one support surface and being arranged between the at least two conveying belts;

wherein the conveying member has lateral support parts that project upwardly past a plane of the support surfaces;

wherein the lateral support parts comprise a base element and at least one finger projecting upwardly from the base element;

wherein neighboring ones of the at least one finger are arranged such that said neighboring fingers delimit an intermediate space between said neighboring fingers when passing through a straight transport plane of the conveying member.

20. The conveying device according to claim 19, wherein the conveying member further comprises transverse rods connecting the at least two conveying belts to one another, wherein the transverse rods are distributed across a length of the at least two conveying belts; wherein the transverse rods each have an underside resting on the lateral edges of the conveying fabric in the area of the recesses, and wherein the transverse rods are connected to the at least two conveying belts by rivets, screws, or clamps, wherein the rivets, screws, or clamps pass through the conveying fabric.

21. The conveying device according to claim 19, wherein the lateral edges of the conveying fabric have a closed material structure.

22. The conveying device according to claim 19, wherein the lateral edges of the conveying fabric comprise at least one of flexible material; tenso-elastic material that is tenso-elastic in at least one direction; and embedded fiber reinforcements.

23. The conveying device according to claim 19, wherein the base element is comprised of flexible material and the at least one finger is pivotable parallel to a conveying direction of the conveying member by a change of a spatial position of the base element, respectively.

24. The conveying device according to claim 23, wherein the at least one finger in a transverse direction relative to a conveying direction of the conveying member has in at least one section a thickened portion or a support rib.

25. The conveying device according to claim 23, wherein the at least one finger is narrower in a section that is farther away from the base element than in a section that is closer to the base element.

26. The conveying device according to claim 23, wherein the base element is strip-shaped and the at least one finger are attached to the base element, respectively.

27. The conveying device according to claim 23, wherein the at least one finger of the support parts has a section projecting downwardly into an area underneath the base element and said section projects farther downwardly than a lowest point of the conveying fabric, wherein the conveying fabric is optionally connected to said section projecting downwardly.

* * * * *